No. 754,966. PATENTED MAR. 22, 1904.
L. BUCSKO.
GLASS MOLD OPERATING APPARATUS.
APPLICATION FILED OCT. 8, 1901. RENEWED JULY 21, 1903.
NO MODEL.

WITNESSES
Roy McIntire
C. W. Downing

Louis Bucsko
INVENTOR
by Connolly Bros.
Attorneys

No. 754,966. Patented March 22, 1904.

UNITED STATES PATENT OFFICE.

LOUIS BUCSKO, OF MONACA, PENNSYLVANIA, ASSIGNOR TO THE PHOENIX GLASS COMPANY, OF PITTSBURG, PENNSYLVANIA, A CORPORATION OF WEST VIRGINIA.

GLASS-MOLD-OPERATING APPARATUS.

SPECIFICATION forming part of Letters Patent No. 754,966, dated March 22, 1904.

Application filed October 8, 1901. Renewed July 21, 1903. Serial No. 166,496. (No model.)

*To all whom it may concern:*

Be it known that I, LOUIS BUCSKO, a citizen of the United States, residing at Monaca, in the county of Beaver and State of Pennsylvania, have invented certain new and useful Improvements in Glass-Mold-Operating Apparatus; and I do hereby declare the following to be a full, clear, and exact description of the invention, such as will enable others skilled in the art to which it appertains to make and use the same.

My invention has relation to the manufacture of articles of glass, and has for its object the provision of a glass-mold which can be operated by the glass-blower alone without the aid of a mold-boy or helper.

My invention consists in the provision of mold-operating devices so constructed and combined that a glass-mold can be opened, closed, and cooled through the medium of the glass-blower's feet.

My invention further consists in the construction, combination, and arrangement of parts more fully described hereinafter, and specifically pointed out in the claims.

Figure 1:
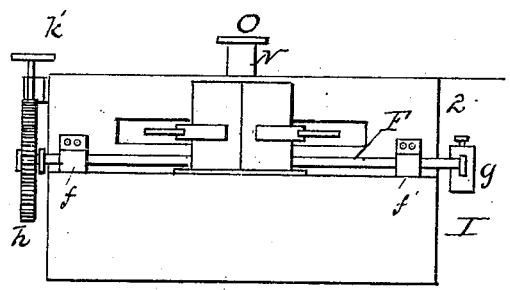
Figure 2:
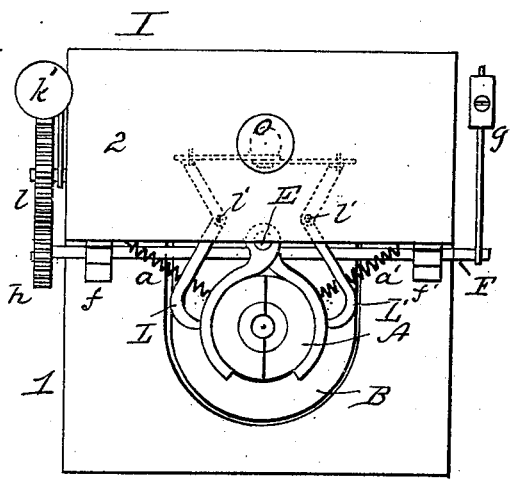
Figure 3:
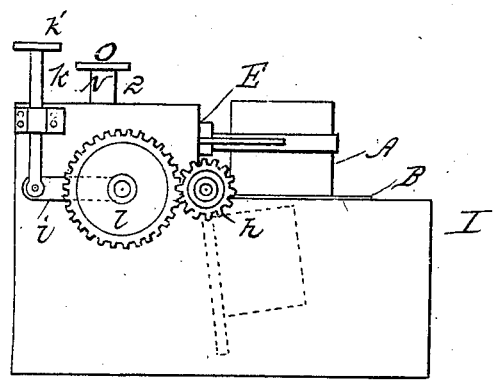
Figure 5:
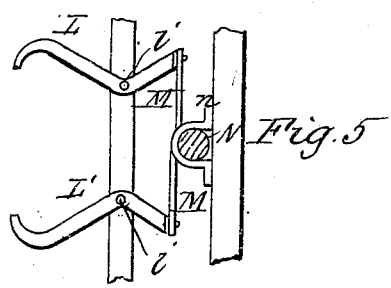
Figure 6:
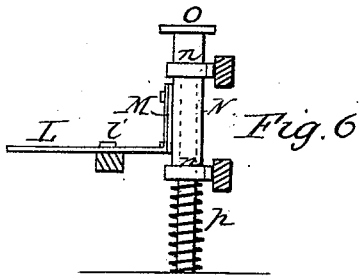

Referring to the accompanying drawings, Figure 1 is a front view; Fig. 2, a bottom view; Fig. 3, a side view; and Figs. 4, 5, and 6 detail views of my improved molding apparatus.

In the ordinary method of molding glass it is necessary to employ a helper, usually a boy or unskilled workman, who is known as a "mold-boy," to manipulate the mold—*i. e.*, open and close it and in the paste-mold to cool it by the use of water. By my invention the employment of the helper is obviated, and thus his wages saved by the proprietor. In addition to the saving of the wages of the helper the operation of the mold according to my invention is much more satisfactory to the glass-blower.

In carrying my invention into effect, I construct a box-like structure 1, having a platform 2, upon which the blower stands while operating the apparatus. The box 1 is watertight and is kept filled with water into which the mold is plunged after each blow, as it is necessary not alone to cool but also to thoroughly wet paste-mold to enable the blower to properly manipulate the mass of glass in the mold. The mold and its operative parts are so placed that they can be readily operated by the glass-blower while standing on the platform 2.

The mold A is situated upon a plate B, which serves as its base, and is attached at its rear hinged joint to an upright E, which moves with the base-plate B. The base-plate B is attached to a shaft F, journaled at $f\ f'$ and having at one end a counterpoise $g$ and at the other end a gear-wheel $h$, the gear-wheel $h$ meshing with gear-wheel $l$, mounted on the side of the platform 2. The gear-wheel $l$ carries an arm $i$, pivotally connected to the treadle $k$, so that pressure on the foot-plate $k'$ will force down the treadle $k$ and arm $i$, causing the gear-wheels $l$ and $h$ and shaft F to make a partial revolution, thus throwing downward the base-plate B and mold A and submerging them in the water contained on the tank 1. The pivot-hole through the end of the arm $i$ should be slightly elongated, so as to permit the arm $i$ to swing without binding on the pivot. Upon releasing the pressure on the treadle $k$ the counterpoise $g$ will cause a revolution of the shaft F and its attached and connected parts, and the now cooled mold will be returned to its original operative position, the springs $a\ a$ causing the sides of the mold to separate so as to admit the ball of glass for blowing and molding.

Figure 4:
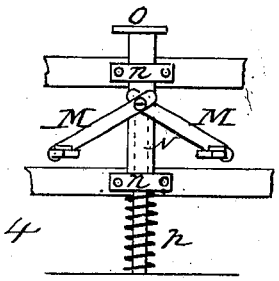

In order to provide for the closing of the mold and keeping it closed during the process of molding, I have provided a pair of arms L L', pivoted at $l'\ l'$, their outer ends embracing the sides of the mold A. The inner ends of the arms L L' are pivotally attached to the levers M M, journaled on the movable standard N. This standard moves in the ways $n\ n$ and is provided with a foot-piece O and a compression-spring $p$. In its normal position it is as shown in Fig. 4 of the drawings, the toggle-levers M M being raised and the arms L L' separated, so as to allow the mold to open. On pressing down the pedal the jaws are drawn together and the mold closed and kept closed till the pedal is released, when the spring $p$ forces it upward, thereby opening the jaws or arms L L'.

The operation of the apparatus is as follows: The parts being in the position for molding—that is, with the treadle O in its elevated position, the mold open, and the plate B in a horizontal position and the tank filled with water—the glass-blower takes his position on platform 2 and places the partially-blown ball of glass on the end of the punty within the cavity of the mold, resting its bottom or end, as is usual in molding, on the base-plate B. He then places one foot on the plate O and pressing down on the same causes the mold to be closed through the medium of the toggle-arms M M and jaws L L'. He then continues the blowing and manipulation of the glass till the article is completed. The foot is then taken from the plate O and the pressure of the spring $p$ causes the upright N to rise up and the toggle-arms M M to be drawn together and the jaws L L' separated, the springs $a$ $a$ opening the mold and permitting the withdrawal of the finished article. The glass-blower now places his foot on the plate $k'$, pressing down the treadle $h$ and arm $i$ and partially revolving the gear wheel $l$ and $h$ and shaft F and immersing the mold in the water contained in the tank 1. Upon removing the foot from plate $k'$ the counterpoise $g$ overbalances the mold and causing a partial revolution of the shaft F returns the mold to its operative position.

The alternate operation of the two treadles is continued while the blowing and molding is being carried on.

What I claim as new is—

1. In a glass-mold-operating apparatus, the combination of a platform, a tank, a hinged plate adapted to swing downwardly into said tank, a rocking shaft to which said plate is secured, mechanism comprising gearing on the shaft, a gear meshing therewith, a treadle and lever for positively rocking said shaft to immerse the plate in the tank and a counterpoise arranged to return said plate to its normal position, substantially as described.

2. In a glass-mold-operating apparatus, the combination of a platform, a tank, a rocking shaft, a plate attached to said shaft, a two-part mold each half of which is independently hinged on a vertical standard on said plate, means comprising a treadle and gearing for positively rocking said shaft to immerse the mold and means for automatically returning the plate to its normal horizontal position and means for positively swinging both halves of the mold simultaneously on their pivotal point to close the mold and for automatically opening the mold, substantially as described.

3. In a glass-mold-operating apparatus, the combination with a swinging base-plate, a two-part mold having its members independently hinged on a standard on said base-plate, of pivoted arms embracing the mold members, toggle-levers connected to said pivoted arms, a vertically-movable standard to which said toggle-levers are connected and springs adapted to spread the mold members apart and raise said standard when the standard is released from pressure, substantially as described.

In testimony whereof I affix my signature in presence of two witnesses.

LOUIS BUCSKO.

Witnesses:
J. F. REED,
A. M. REED.